US 9,262,461 B2

(12) United States Patent
Rao et al.

(10) Patent No.: US 9,262,461 B2
(45) Date of Patent: *Feb. 16, 2016

(54) AGGREGATING KEYS OF DEPENDENT OBJECTS FOR A GIVEN PRIMARY OBJECT

(71) Applicant: CA, Inc., Islandia, NY (US)

(72) Inventors: B.V.K.Venu Gopala Rao, Ongole (IN); Muruganandam Somasundaram, Karnataka (IN); James L. Broadhurst, Batavia, IL (US); Timothy J. Weltzer, Monroe Center, IL (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,194

(22) Filed: Nov. 4, 2014

(65) Prior Publication Data

US 2015/0088900 A1    Mar. 26, 2015

Related U.S. Application Data

(63) Continuation of application No. 13/693,412, filed on Dec. 4, 2012, now Pat. No. 8,914,343.

(51) Int. Cl.
*G06F 17/30* (2006.01)

(52) U.S. Cl.
CPC .... *G06F 17/30339* (2013.01); *G06F 17/30589* (2013.01)

(58) Field of Classification Search
CPC ............... G06F 17/30008; G06F 17/30339; G06F 17/30589; G06F 17/30864; G06F 17/30595; G06F 17/30607; G06F 17/30604; G06F 17/30587; G06F 17/30911; G06F 17/30327; G06F 17/20622; G06F 17/3089; G06F 17/30; G06F 8/24; G06Q 10/10; Y10S 707/955; Y10S 707/956; Y10S 707/99933; Y10S 707/99943; Y10S 707/00; Y10S 707/99938; Y10S 707/99952
USPC ......... 707/703, 741, 802, 803, 825, 955, 960, 707/692; 717/108
See application file for complete search history.

(56) References Cited

U.S. PATENT DOCUMENTS 5,488,721 A    1/1996   Rich et al.
5,692,184 A *  11/1997  Ardoin et al. ................. 700/182

(Continued)

OTHER PUBLICATIONS

CA Technologies; A Solid Foundation for Successful DB2 Database Management; Product Family Brief; CA Database Management for DB2 for z/OS; 2011; pp. 1-12.

(Continued)

*Primary Examiner* — Greta Robinson
(74) *Attorney, Agent, or Firm* — Stevens & Showalter LLP

(57) ABSTRACT

Keys are obtained and aggregated by storing a primary object as an entry in a parent keys storage and a child keys storage, the entry identified as unvisited in each. An object evaluation process is then performed until all unique entries in the parent keys storage and all unique entries in the child keys storage have been visited and by committing the keys of at least one related object as an entry to the hierarchical database. The object evaluation process visits each unvisited object in the parent keys storage and child keys storage by selecting, for the unvisited object, objects in the parent direction that have not already been visited and objects in the child direction that have not already been visited and by inserting the keys of the selected related objects as entries in the parent keys storage or child keys storage.

20 Claims, 9 Drawing Sheets

(56) References Cited

U.S. PATENT DOCUMENTS

| | | | |
|---|---|---|---|
| 7,412,455 B2* | 8/2008 | Dillon | 1/1 |
| 8,914,343 B2* | 12/2014 | Rao et al. | 707/703 |
| 2009/0012993 A1 | 1/2009 | Conn et al. | |
| 2009/0019080 A1 | 1/2009 | Miller | |
| 2009/0265370 A1 | 10/2009 | Rucker et al. | |
| 2010/0235907 A1 | 9/2010 | Bowman et al. | |
| 2013/0339406 A1 | 12/2013 | Kanfi | |
| 2014/0156709 A1 | 6/2014 | Rao et al. | |

OTHER PUBLICATIONS

CA Technologies; CA RC/Extract for DB2 for z/OS; Product Sheet; CA RC/Extract for DB2 for z/OS; 2012; pp. 1-6.

Venturebeatprofiles; SoftBase System Overview; http://venturebeatprofiles.com/company/profile/softbase-systems;Oct. 14, 2011; pp. 1-4.

PR Newswire; Compuware Announces Tools That Accelerate and Improve Test Data; Latest Product Versions Efficiently Manage Test Data for Year 2000 and More; http://www.prnewswire.com/news-releases/compuware-announces-tools-that-accelerate-and-improve-test-data-78075152.html; Jun. 29, 1998; pp. 1-4.

Compuware Mainframe Solutions; Fact Sheet: File-Aid/RDX; Get Just the Data You Need; www.compuware.com/mainframe-solutions/r/Fileaid__rdx.pdf; 4 pages; 2011.

Princeton Softech; Failsafe Testing; Delivering Applications that Work; White Paper; 12 pages; Jul. 2000.

Cleversys; Move—Technical Overview; http://www.cleversys.de/m42tecov.htm; 3 pages; Jun. 20, 2003.

Lifeboat Distribution; Compuware File-AID/CS; Test Data Management for Application Quality; 8 pages; Nov. 2005.

Greta Lee Robinson; Office Action; U.S. Appl. No. 13/693,412; Apr. 1, 2014; United States Patent and Trademark Office; Alexandria, Virginia.

* cited by examiner

| Column Name | Description |
|---|---|
| VERSION | Version of relational database |
| OTYPE | Catalog table name |
| PKJOINCONDITION | SQL join condition between catalog table primary key columns and temporary result table (holds unvisited object primary key values) key columns. |
| KNS_OT2 | Primary keys |

| Column Name | Description |
|---|---|
| VERSION | Relational database version |
| OTYPE1 | Catalog table name |
| OTYPE2 | Catalog table name |
| DIRECTION | Parent or Child Direction where this join condition applied |
| JOINCONDITION | The WHERE clause used to join these two tables i.e. OTYPE1 and OTYPE2 |
| OTYPE1_ROLE | Major/Minor object |
| SPECIAL PROCESS | Special processing flag required for some objects such as SYSRELS in order to get other dependent objects |

| Input Parameter Name | Description |
| --- | --- |
| INP_OFSKT | Key table name – Name of the result table that is built by the NSP which is unique for every call to the NSP |
| INP_VERSION | Relational database version |
| INP_LOCATION | Location Id for the relational subsystem if the location is not local |
| INP_ACMID | Alternate Catalog Mapping id |
| MASKSET | Mask used for filtering what objects the user of the NSP requires |
| AUX_IMP | Auxiliary Implode Explode |
| RI_OPTION | Local, Global |
| INP_OTYPE | Primary object type |
| KV1 | Value of first primary key |
| KV2 | Value of second primary key if exists |
| KV3 | Value of third primary key if exists |
| KV4 | Value of fourth primary key if exists |
| KV5 | Value of fifth primary key if exists |
| KV6 | Value of sixth primary key if exists |
| KV7 | Value of seventh primary key if exists |
| KV8 | Value of eighth primary key if exists |
| KV9 | Value of ninth primary key if exists |

| Column Name | Description |
|---|---|
| OTYPE | Catalog table name (e.g. SYSTABLES) |
| KV1 | Contains value of first primary key |
| KV2 | Contains value of second of primary key if exists |
| KV3 | Contains value of third primary key if exists |
| KV4 | Contains value of fourth primary key if exists |
| KV5 | Contains value of fifth primary key if exists |
| KV6 | Contains value of sixth primary key if exists |
| KV7 | Contains value of seventh primary key if exists |
| KV8 | Contains value of eighth primary key if exists |
| KV9 | Contains value of ninth primary key if exists |

FIG. 5

AGGREGATING KEYS OF DEPENDENT OBJECTS FOR A GIVEN PRIMARY OBJECT

CROSS REFERENCE TO RELATED APPLICATIONS

This application is a continuation of U.S. patent application Ser. No. 13/693,412, filed Dec. 4, 2012, entitled "AGGREGATING KEYS OF DEPENDENT OBJECTS FOR A GIVEN PRIMARY OBJECT", now allowed, the disclosure of which is hereby incorporated herein by reference.

BACKGROUND

The present disclosure relates in general to relational databases and more particularly, to the aggregation of keys of dependent objects for a given primary object of a hierarchical database.

Many businesses and institutions make use of relational databases to organize data in a form that is easy to access, organize, and manipulate. Relational databases store their metadata pertaining to user objects in relational tables called catalog tables. These catalog tables have inherent hierarchical relationships between them. For example, in an illustrative implementation of a relational database, a SYSTABLES catalog table (e.g., which holds the metadata about user tables) is related to a SYSTABLESPACES catalog table (e.g., which holds the metadata about tablespaces of the user tables). In this example, the primary key of the SYSTABLES catalog table can include multiple attributes, such as the name of the table and the creator of the table. The foreign keys of the SYSTABLES catalog table can include the name of the database and the name of the tablespace. As another example, a single foreign key may include multiple attributes, including the name of the database and the name of the tablespace. Correspondingly, the primary key of the SYSTABLESPACES catalog table can include multiple attributes, such as the name of the database and the name of the tablespace.

In the above exemplary configuration, given the primary keys of SYSTABLES, which describe the user tables in a corresponding database, it is possible to obtain the tablespace in which a given user table resides by querying the SYSTABLESPACE catalog table. Given the primary keys of the SYSTABLESPACES, which describe the database and tablespaces for a relational database, it is possible to obtain all the user tables residing in a given tablespace by querying the SYSTABLES catalog table.

BRIEF SUMMARY

According to aspects of the present disclosure, systems, methods and computer program products are provided for obtaining and aggregating keys of objects. Keys are obtained and aggregated by obtaining a primary object input comprising a primary object of a hierarchical database, by storing the primary object as an entry in a parent keys storage where the entry is identified as unvisited, and by storing the primary object as an entry in a child keys storage where the entry is identified as unvisited. Keys are obtained and aggregated by further performing an object evaluation process that selects related objects of the primary object until all unique entries in the parent keys storage and all unique entries in the child keys storage have been visited. Keys are obtained and aggregated by further committing the keys of at least one related object as an entry to the hierarchical database.

The object evaluation process visits each unvisited object in the parent keys storage by selecting, for the unvisited object, related objects comprising parent objects in the parent direction that have not already been visited and child objects in the parent direction that have not already been visited and by inserting the selected related objects as entries in the parent keys storage identified as unvisited.

The object evaluation process also visits each unvisited object in the child keys storage by selecting, for the unvisited object, related objects comprising child objects in the child direction that have not already been visited and parent objects in the child direction that have not already been visited and by inserting the selected related objects as entries in the child keys storage identified as unvisited.

BRIEF DESCRIPTION OF THE DRAWINGS

FIG. 2 is an exemplary prerequisite table that contains the primary keys of catalog tables, which may be used with the methods of FIG. 1 or FIG. 6, according to aspects of the present disclosure;

FIG. 3 is an exemplary prerequisite table that contains the relationships between catalog tables, which may be used with the methods of FIG. 1 or FIG. 6, according to aspects of the present disclosure;

FIG. 4 is a table that contains exemplary input parameters, which may be used with the methods of FIG. 1 or FIG. 6, according to aspects of the present disclosure;

FIG. 5 is an exemplary output table that contains the aggregated keys, which may be used with the methods of FIG. 1 or FIG. 6, according to aspects of the present disclosure;

DETAILED DESCRIPTION

Figure 1:
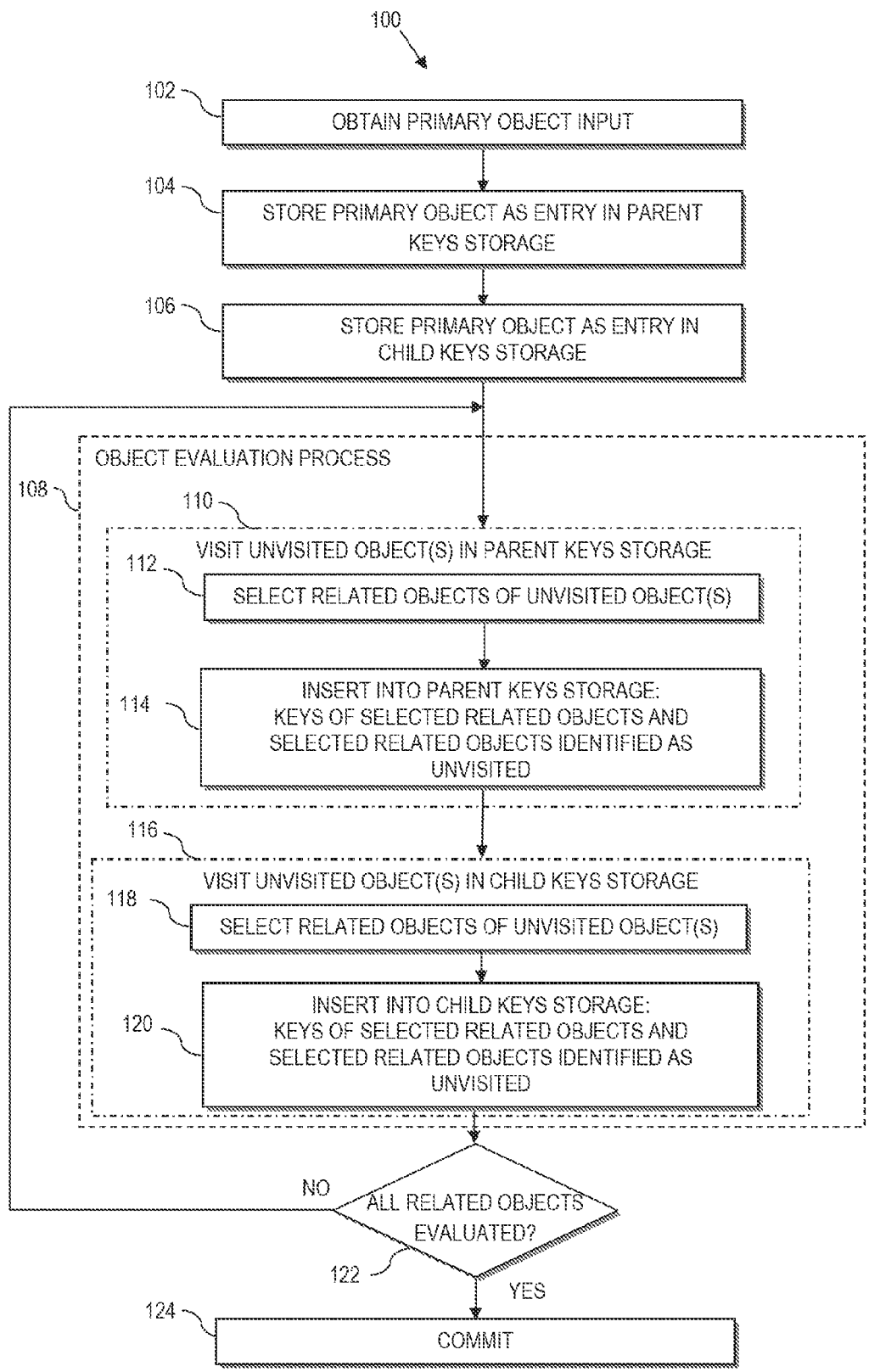
FIG. 1 is a flow chart illustrating a method of obtaining and aggregating keys of objects that are related to a primary object, according to aspects of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Overview:

There are many relationships within the catalog tables (referenced herein generally as objects) that make up a catalog of a relational database. By way of illustration, assume that a relational table having a name MYSCHEMA.MYTABLE is residing in DB2. Further, assume that MYSCHEMA.MYTABLE has a plurality of relationships. For purposes of this example, assume that:

MYSCHEMA.MYTABLE is part of MYSCHEMA.MYTABLESPACE;

MYSCHEMA.MYTABLESPACE is under database MYSCHEMA.MYDB; and

MYSCHEMA.MYDB is under storage group MYSCHEMA.MYSG.

Further, assume for this example that MYSCHEMA.MYTABLE has:

A view named MYSCHEMA.MYVIEW;

An index named MYSCHEMA.MYINDEX;

An alias named MYSCHEMA.MYALIAS; and

A synonym named MYSCHEMA.MYSYNONYM.

Expressed as an exemplary graph, the storage group MYSCHEMA.MYSG is the root node of the graph. Database MYSCHEMA.MYDB is a child node of the storage group MYSCHEMA.MYSG. MYSCHEMA.MYTABLESPACE is a child node of the database MYSCHEMA.MYDB. MYSCHEMA.MYTABLE is a child node of MYSCHEMA.MYTABLESPACE. The view named MYSCHEMA.MYVIEW, the index named MYSCHEMA.MYINDEX, the alias named MYSCHEMA.MYALIAS and the synonym named MYSCHEMA.MYSYNONYM are all child nodes of MYSCHEMA.MYTABLE.

Given the keys of an object (designated herein as the primary object), it is possible to obtain the keys of related objects (e.g., the parent objects and child objects of the primary object) using relationships discoverable within a corresponding catalog structure. Keeping with the above example, given the keys of a primary object, e.g., the table object MYSCHEMA.MYTABLE, it is possible to find and aggregate the keys of the related objects, e.g., the seven remaining objects MYSCHEMA.MYSYNONYM, MYSCHEMA.MYTABLESPACE, MYSCHEMA.MYALIAS, MYSCHEMA.MYSG, MYSCHEMA.MYDB, MYSCHEMA.MYVIEW, and MYSCHEMA.MYINDEX.

The process of obtaining the keys of the related objects, given the key of the primary object finds many uses in the area of tools around the relational database (e.g., CA DB2 Tools around DB2 for z/OS). According to various aspects of the present disclosure, approaches are disclosed to obtain and aggregate the keys of related objects given a primary relational object.

Native Stored Procedure (NSP) Approach:

According to aspects of the present disclosure, a "native stored procedure" (NSP) approach is provided for obtaining and aggregating the keys of all related objects given a primary object. As will be described more fully herein, the NSP approach uses dynamically generated structured query language (SQL) to query the catalog tables of an associated catalog in order to obtain and aggregate keys of objects that are related to a primary object.

As used herein in the context describing the NSP approach, the term "object" is used broadly for convenience of discussion to represent information that describes or characterizes a table such as a catalog table in a catalog of a hierarchical database. For instance, in illustrative implementations, the term "object" may refer simply to keys (e.g., the primary keys of a corresponding catalog table). The term "object" may also include a set of parameters that comprise an object type (e.g., catalog table name) and at least one key (e.g., at least one parameter that contains a value of a primary key). Thus, in this illustrative implementation, an "object" inherently includes the keys (e.g., primary keys) associated with an object type. In practice, an "object" may be implemented by other structures so long as the desired resulting keys can be obtained, derived, extracted or otherwise result from the NSP approach implemented.

Native Stored Procedure - Example:

Referring now to the drawings, and in particular to FIG. 1, a method 100 of obtaining and aggregating keys may be provided for example, as a computer program product implemented as a computer readable storage medium comprising computer readable program code for obtaining and aggregating keys of objects. The method may also be implemented by a system comprising a microprocessor coupled to a memory, where the microprocessor is programmed by modules or otherwise by code stored in the memory, which when executed by the processor, obtains and aggregates keys of objects.

The method 100 comprises obtaining a primary object input at 102. The primary object input includes a primary object of a hierarchical database. The method 100 also comprises storing the primary object as an entry in a parent keys storage at 104, where the entry is identified as unvisited. Similarly, the method comprises storing the primary object as an entry in a child keys storage at 106, where the entry is identified as unvisited.

As will be described in greater detail herein, the terms "visited" and "unvisited" with regard to an object are used to indicate whether that object has been evaluated, considered or otherwise processed in order to determine if there are objects that are related to the visited object, to identify the keys of any such related object(s), or combinations thereof.

The method 100 also comprises performing an object evaluation process at 108 until all unique entries in the parent keys storage and all unique entries in the child keys storage have been visited. The object evaluation process selects related objects of the primary object by visiting each unvisited object in the parent keys storage (referred to herein as an "implode" process) at 110 to select related parent keys objects. More particularly, each unvisited object in the parent keys storage is visited at 110 by selecting, for the unvisited object being visited, any related objects at 112. Here, the related objects comprise parent objects in the parent direction that have not already been visited and child objects in the parent direction that have not already been visited. The object evaluation process further comprises inserting the selected related object(s) as entries in the parent keys storage identified as unvisited at 114. As such, any new objects added to the parent keys storage will be visited the next time the process loops around.

Similarly, the object evaluation process selects related objects of the primary object by visiting each unvisited object in the child keys storage (referred to herein as an "explode process") at 116 to select related child keys objects. More particularly, each unvisited object in the child keys storage is visited at 116 by selecting, for the unvisited object being visited, any related objects at 118. Here, the related objects comprise child objects in the child direction that have not already been visited and parent objects in the child direction that have not already been visited. The object evaluation process further comprises inserting the selected related object(s) as entries in the child keys storage identified as unvisited at 120. As such, any new objects added to the child keys storage will be visited the next time the process loops around.

As noted in greater detail above, in illustrative implementations, adding a new object implies adding keys of that new object (e.g., adding the primary keys and catalog table name to the parent keys storage or to the child keys storage).

A decision is made at 122 as to whether all related objects have been evaluated. For instance, if there are objects in either the parent keys storage or child keys storage that have not been visited, the method 100 loops back to the object evaluation process at 108. The method also comprises committing the keys of at least one related object as an entry to the hierarchical database at 124.

According to certain aspects of the present disclosure, the method 100 may utilize temporary tables to serve as work areas, e.g., to implement the parent keys storage and child keys storage. For instance, the method 100 may include creating the parent keys storage as two temporary tables, designated herein for sake of example, as a visited parent keys table and an unvisited parent keys table. Similarly, the method may include creating the child keys storage as two temporary tables, designated herein for sake of example, as visited child keys table and an unvisited child keys table. The method 100 may also create a results table, which will be used to aggregate the keys of related objects. As such, the results table is also referred to herein as the keys table. The parent keys table and the child keys table may each comprise structure that is the same as (or similar to) the structure of the results table. The parent keys table and the child keys table may also contain additional features compared to the results table, such as a field that stores a flag indicating whether the object has been visited or not.

Using the above temporary tables, in an illustrative example, the method 100 stores the primary object as an entry in the parent keys storage by inserting the primary object in the unvisited parent keys table. Analogously, the method 100 stores the primary object as an entry in the child keys storage by inserting the primary object in the unvisited child keys table. In this implementation, the method 100 visits each unvisited object in the parent keys storage by identifying a next unvisited object in the unvisited parent keys table (this object now becomes the current object being processed). The related objects of the current object selected by the method 100 are inserted into the unvisited parent keys table. Once an object in the unvisited parent keys table has been visited, that object is copied to the visited parent keys table. A cleanup procedure can later be used to remove visited objects from the unvisited parent keys table.

Analogously, the method 100 visits each unvisited object in the child keys storage by identifying a next unvisited object in the unvisited child keys table (this object now becomes the current object being processed). The related objects of the current object selected by the method 100 are inserted into the unvisited child keys table. Once an object in the unvisited child keys table has been visited, that object is copied to the visited child keys table. A cleanup procedure can later be used to remove visited objects from the unvisited child keys table.

Thus, the method 100 further comprises deleting each object from the unvisited parent keys table after the object has been visited and deleting each object from the unvisited child keys table after the object has been visited. This prevents the same object in the parent keys storage from being considered multiple times. Likewise, this prevents the same object in the child keys storage from being processed multiple times.

According to a further illustrative implementation of the present disclosure herein, the object evaluation process at 108 performs the implode process by inserting the objects from the unvisited parent keys table to the visited parent keys table and by marking objects as visited in the unvisited parent keys table. The exemplary implode further performs the object evaluation process by initially setting a compound query to empty, preparing a select query to get the values of the primary keys of the related objects and appending the select query to the compound query. More particularly, the implode may be performed by preparing a first SQL statement for obtaining parent objects in parent direction and by preparing a second SQL statement for obtaining child objects in parent direction. The selected related objects are inserted as entries in the unvisited parent keys table using the compound query. For instance, the exemplary implode generates a third SQL statement that combines the first and second SQLs using a UNION so as to generate results with unique rows, and that avoids already visited objects (e.g., in the visited parent keys table) using an EXCEPT clause. The new objects are inserted as new unvisited objects into the unvisited parent keys table by executing the third SQL statement. The visited objects are then deleted from the unvisited parent keys table as a cleanup process.

Analogously, the object evaluation process at 108 performs the explode process by inserting the objects from the unvisited child keys table to the visited child keys table and by marking the objects as visited in the unvisited child keys table. The exemplary explode further performs the object evaluation process by initially setting a compound query to empty, preparing a select query to get the values of the primary keys of the related objects and appending the select query to the compound query. More particularly, the explode may be performed by preparing a fourth SQL statement for obtaining parent objects in the child direction and by preparing a fifth SQL statement for obtaining child objects in child direction. The selected related objects are inserted as entries in the unvisited child keys table using the compound query. For instance, the exemplary explode generates a sixth SQL statement that combines the fourth and fifth SQLs using a UNION so as to generate results with unique rows, and that avoids already visited objects (e.g., in the visited child keys table) using an EXCEPT clause. The new objects are inserted as new unvisited objects into the unvisited child table by executing the sixth SQL statement. The visited objects are deleted from the unvisited child keys table as a cleanup process.

The evaluation process at 108 (e.g., the implode and explode processes discussed above) continues until there are no objects in the unvisited parent keys table and there are no objects in the unvisited child keys table. Once both the unvisited parent keys table and the unvisited child keys tables are empty, the related object keys are inserted in the results table (e.g., the keys table). As an example, the related objects (and/or the keys of related objects) may be committed to the hierarchical database by merging the visited parent keys table with the visited child keys table into the results table, by dropping the visited and unvisited parent keys table, dropping the visited and unvisited child keys table and by committing each entry in the results table to the hierarchical database. The SQL UNION may be used to combine the related objects from the visited parent keys table and the visited child keys table. After the results are copied to the results table, the temporary tables may be dropped.

Another illustrative exemplary approach for performing the implode process of the object evaluation at 108 comprises obtaining the primary keys of the (current) unvisited object in the parent keys storage and preparing a select query for related objects in the parent direction. For each related object, the implode is executed by obtaining the primary keys of the related object, preparing a select query that obtains the values of the primary keys of the related object, and appending the select query to a compound query. The select query may be prepared for Minor objects. In this regard, the implode may be performed for each Minor object by obtaining the primary keys of the Minor object, preparing a select query that obtains the values of the primary keys of the Minor object and appending the select query to a compound query. The selected related objects are inserted as entries in the unvisited parent keys table using the compound query statement.

Analogously, the explode process in this example of the object evaluation at 108 comprises obtaining the primary keys of the (current) unvisited object from the child keys storage and preparing a select query for related objects in the child direction. For each related object, the explode is executed by obtaining the primary keys of the related object, preparing a select query that obtains the values of the primary keys of the related object, and appending the select query to a compound query. The select query may be prepared for Major objects. In this regard, the explode may be performed for each Major object by obtaining the primary keys of the Major object, preparing a select query that obtains the values of the primary keys of the Major object and appending the select query to a compound query. The selected related objects are inserted as entries in the unvisited child keys table using the compound query statement.

Native Stored Procedure Example:

Another exemplary implementation of the NSP approach is described below with reference generally to FIG. 2-FIG. 8, which implements aspects described above with regard to the method of FIG. 1. The below described NSP approach utilizes a set of prerequisite tables. Prerequisite tables may be created for instance, as part of post installation of a database. Referring to FIG. 2, a first prerequisite table 200 is a primary keys prerequisite table, referred to herein as OFS_PK. The OFS_PK table contains primary keys of each catalog table of a catalog. As illustrated in FIG. 2, the structure of the OFS_PK table includes a VERSION field that stores the version of the relational database. The OFS_PK table includes an OTYPE filed that stores the Catalog name and a PKJOINCONDITION field that stores the SQL join condition between the catalog table primary key columns and the temporary result table key columns. The temporary result table holds the unvisited object primary key values. The OFS_PK table also holds a KNS_OT2 field that stores the primary keys.

Referring to FIG. 3, a second prerequisites table is a relationships prerequisite table 300, referred to herein as OFS_RT. The OFS_RT table contains the relationships of a catalog table with other catalog tables and is represented by a JOIN condition. As illustrated in FIG. 3, the structure of the OFS_RT table includes a VERSION field that stores the relational database version, an OTYPE1 field that stores a first Catalog Table Name and an OTYPE2 field that stores a second Catalog Table Name. The OFS_RT table also includes a DIRECTION field that stores the Parent or Child Direction where the join condition applied and a JOINCONDITION field that stores the WHERE clause used to join the two tables identified by the OTYPE1 and OTYPE2 fields. The OFS_RT table also includes an OTYPE1_ROLE field that stores whether the object is a Major object or a Minor object.

As used herein, Major objects are relational objects for which DDL exists (e.g. Storage Group, Database etc.). Minor Objects are relational objects on which Major objects are dependent for DDL generation (e.g. SYSVOLUMES for a Storage Group, SYSCOLUMNS for Table, etc.). The OFS_RT table still further includes a SPECIAL PROCESS field that stores a special processing flag required for some objects such as SYSRELS in order to get other dependent objects.

In this illustrative example, there may be other prerequisite requirements. For instance, there may be a requirement that the NSP is created within the relational subsystem, that necessary authorization is provided to create temporary tables and also to run the NSP, etc.

Referring to FIG. 4, in this exemplary NSP approach, the primary object input is passed as a set of parameters 400. A non-limiting but illustrative set of parameters 400 includes an INP_OFSKT parameter that stores a key table name, such as the name of the result table that is built by the NSP. The result table is unique for every call to the NSP. The exemplary input parameters also include an INP_VERSION parameter that stores the relational database version, an INP_LOCATION parameter that stores a location identification for the relational subsystem if the location is not local, and an INP_ACMID parameter that stores an Alternate Catalog Mapping Identification. The Alternate Catalog Mapping (ACM) input is provided for users that create shadow catalog tables, which are created as a copy of the relational catalog tables for performance reasons. Instead of using the regular catalog tables, shadow catalogs are queried if the ACM parameter is set.

The exemplary input parameters also include a MASKSET parameter that stores a mask used for filtering what objects the user of the NSP requires. For instance, as described more fully herein, the NSP performs an object evaluation process by imploding the parents of the primary object and exploding all the child objects of the primary object. In illustrative implementations, the user of the NSP can control keys of what objects gets populated in the result table. For instance, if a user does not want to see keys of a certain object type (e.g., the user doesn't want to see indexes), then the user can filter out indexes by sending a mask as an input to the NSP using the MASKSET parameter.

The exemplary input parameters further include an AUX_IMP parameter to control whether an Auxiliary Implode operation is performed (described in greater detail below). The exemplary input parameters also include an RI_OPTION parameter to specify a Local or Global status and an INP_OTYPE parameter that stores the Primary object type. Still further, the exemplary input parameters include one or more primary key values, e.g., designated KV1-KV9. In practice, any number of primary key values can be passed as input parameters.

Referring to FIG. 5, as described in greater detail herein, the NSP can generate an output table 500, referred to as a results (or keys) table. In the illustrative implementation, the results table 500 returns the primary keys of all objects that are related to the primary object. The illustrated exemplary results table 500 includes an OTYPE field that stores a Catalog table name (e.g. SYSTABLES). The results table 500 also stores primary keys of the object identified by the OTYPE field. For instance, the results table 500 includes fields KV1-KV9 to contain values of up to nine primary keys (or however many exist).

Figure 6:
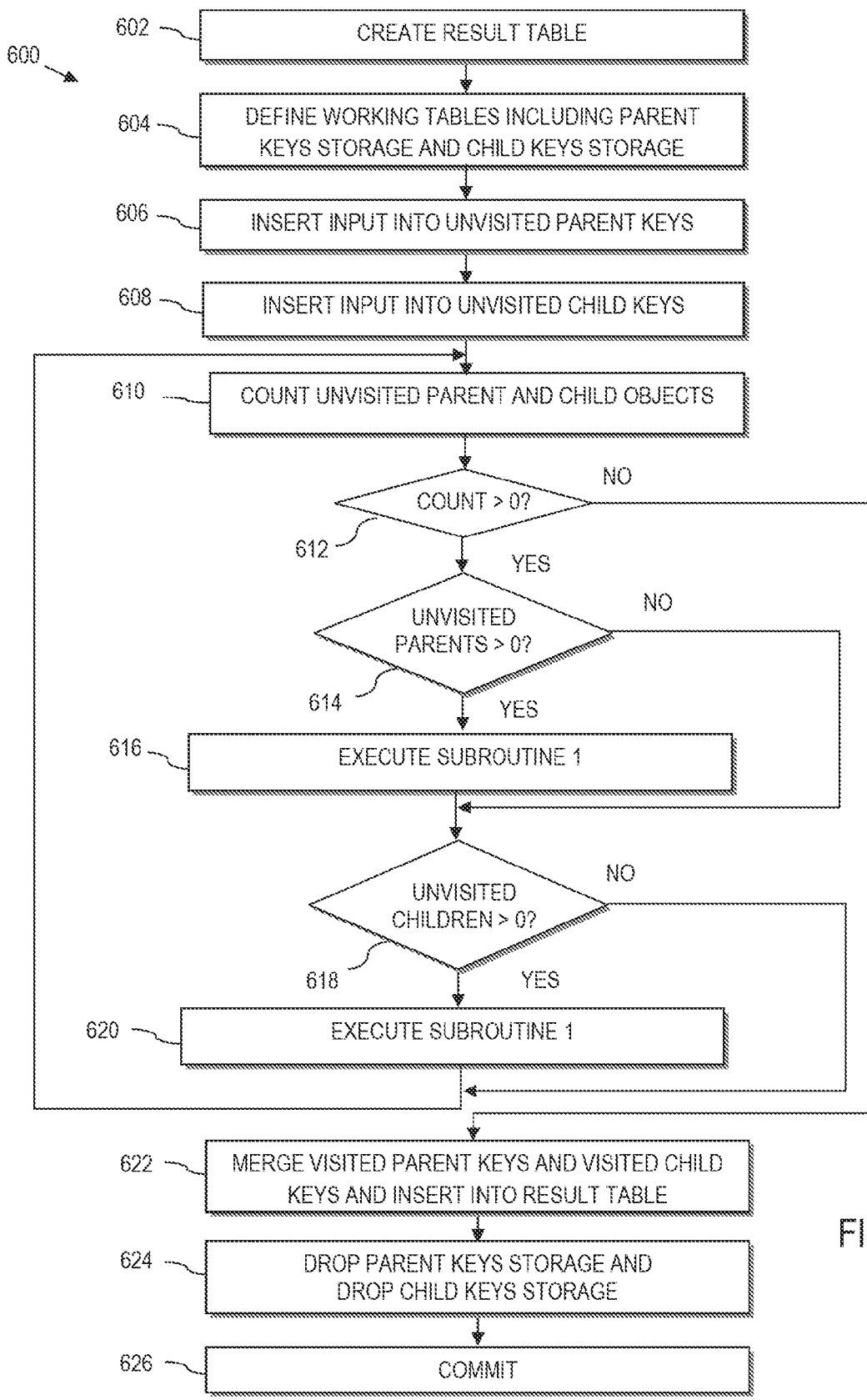
FIG. 6 is a flow chart illustrating another method of obtaining and aggregating keys of objects that are related to a primary object, according to aspects of the present disclosure.
Figure 7:
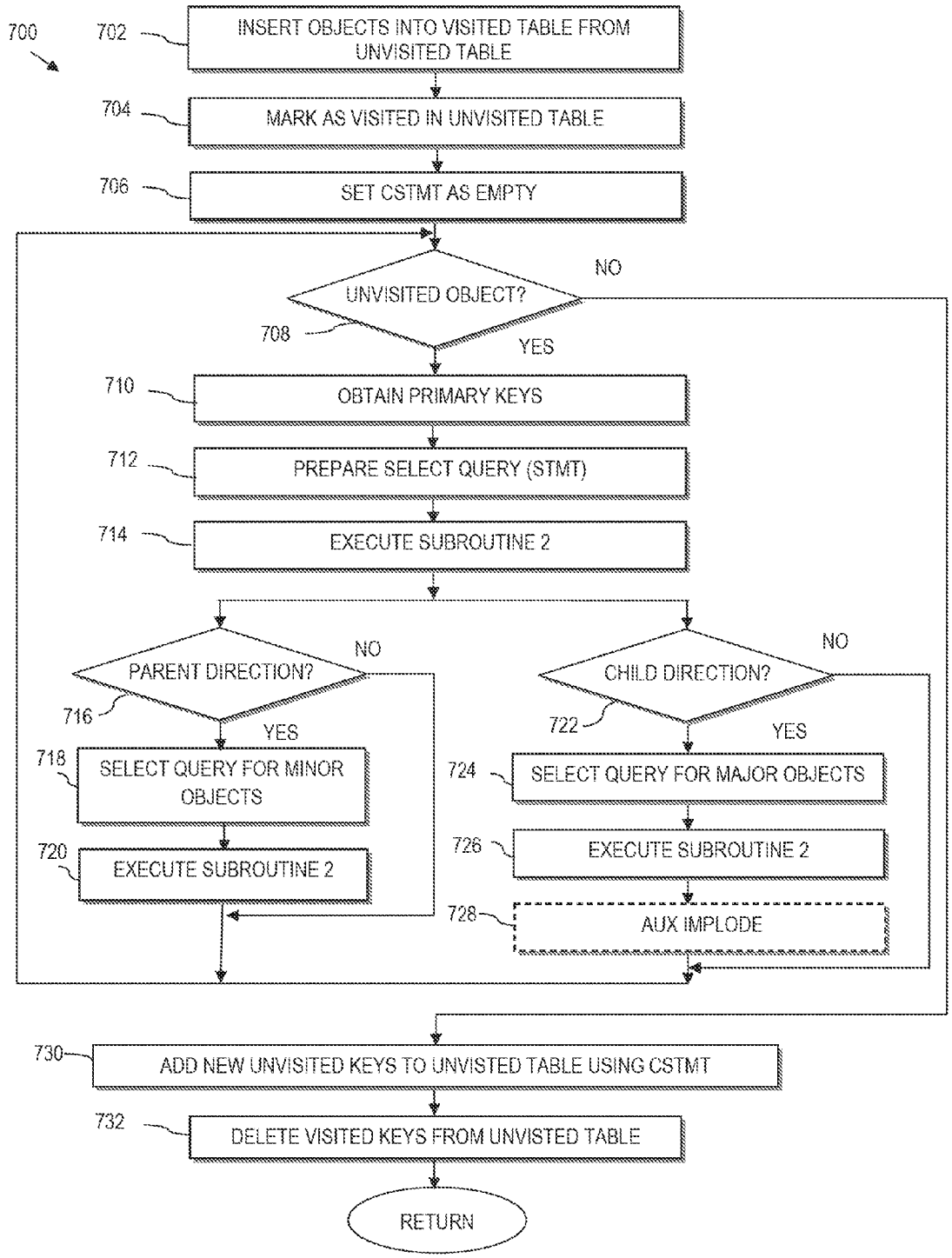
FIG. 7 is a flow chart illustrating a sub-method of the method of FIG. 6, according to aspects of the present disclosure.
Figure 8:
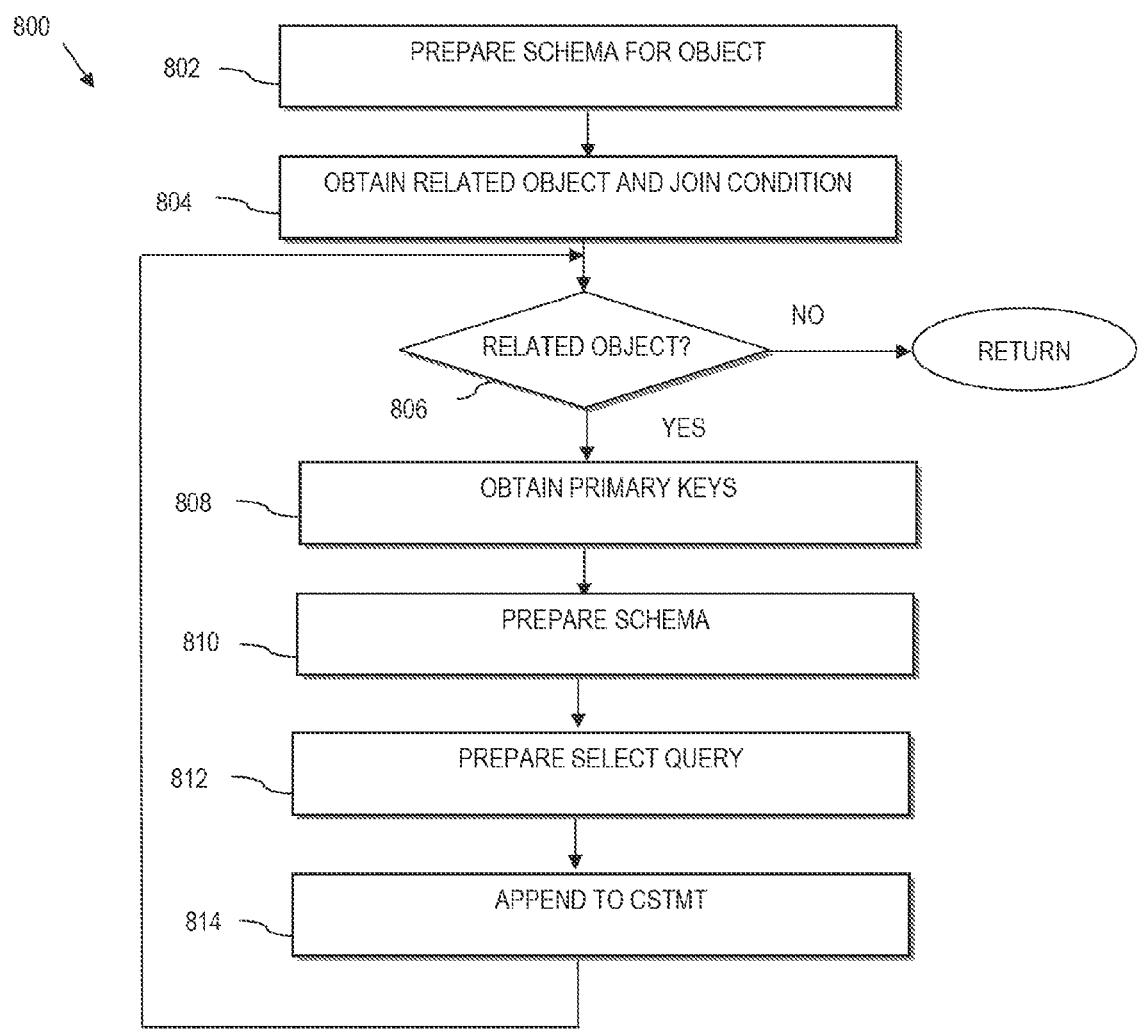
FIG. 8 is a flow chart illustrating a sub-method of the method of FIG. 7, according to aspects of the present disclosure.

Referring to FIG. 6, a main routine describes a method 600 for obtaining the keys of related objects of a primary object, according to aspects of the present disclosure herein. The method 600 may be provided for example, as a computer program product implemented as a computer readable storage medium comprising computer readable program code for obtaining and aggregating keys of objects. The method may also be implemented by a system comprising a microprocessor coupled to a memory, where the microprocessor is programmed by modules or otherwise by code stored in the memory, which when executed by the processor, obtains and aggregates keys of objects.

The method 600 includes creating a results table at 602. The results table may be defined as a Global temporary table (GTT). Similarly, working tables are defined at 604. The working tables can include a parent keys storage, e.g., implemented as a visited parent keys table and an unvisited parent keys table, as well as a child keys storage, e.g., as implemented as a visited child keys table and an unvisited child keys table. Each of the working tables may be implemented as Global temporary tables (GTT).

The method 600 includes storing the input as an entry in the parent keys storage and storing the input as an entry in the child keys storage. For instance, the method 600 inserts the input, e.g., a primary object type and keys of the primary object, into the unvisited parent keys table at 606. The method also inserts the input into the unvisited child keys table at 608. In this example, the unvisited parent keys table includes a field that identifies whether the object has been visited. Initially, the primary object is marked as unvisited. Analogously, the unvisited child keys table also includes a field that identifies whether the object has been visited. Again, the primary object is marked as unvisited.

The method 600 also includes computing the total number of unvisited objects at 610. The total number of unvisited objects can be determined for instance, by counting the objects in the unvisited parent keys table, counting the objects in the unvisited child keys table and adding the counts together. In the first iteration through the method, the total count is two since the primary object is inserted into each of the unvisited parent keys table and unvisited child keys table.

The method 600 then performs an object evaluation process until all unique entries in the parent keys storage and all unique entries in the child keys storage have been visited. In this exemplary implementation, the object evaluation process determines at 612, whether the total count of unvisited objects is zero. If the total count of unvisited objects is not zero, the process evaluates the unvisited objects. The object evaluation process selects related objects of the primary object by determining whether there are unvisited objects in the parent keys storage at 614. If there are unvisited objects in the parent keys storage, the method calls a SUBROUTINE 1 at 616. If there are no unvisited objects, the flow skips over SUBROUTINE 1. The object evaluation process continues by determining whether there are unvisited objects in the child keys storage at 618. If there are unvisited objects in the child keys storage, the method calls SUBROUTINE 1 at 620. If there are no unvisited objects, the flow skips over SUBROUTINE 1. After considering unvisited objects in the parent keys storage and after considering unvisited objects in the child keys storage, the method considers whether there are still unvisited objects by looping back to 610.

If the total count of unvisited objects is zero, the method 600 merges the visited parent keys table and the visited child keys table to the results table at 622, and performs a cleanup at 624. The cleanup at 624 comprises dropping the unvisited parent keys table, dropping the unvisited child keys table, dropping the visited parent keys table and dropping the visited child keys table. The results table is committed to the database at 626.

Exemplary Pseudocode for the Method 600:

```
CREATE result table;
DEFINE visited parent keys table to hold keys of objects in the parent
direction;
DEFINE visited child keys table to hold keys of objects in the child
direction;
DEFINE unvisited parent keys table to hold keys of objects in the parent
direction;
DEFINE unvisited child keys table to hold keys of objects in the child
direction;
INSERT into unvisited parent keys table, the primary object type and keys
of the primary object;
INSERT into unvisited child keys table, the primary object type and keys
of the primary object;
LOOP
   OBTAIN count of objects in the unvisited parent keys table;
   OBTAIN count of objects in the unvisited child keys table;
   COMPUTE total count of unvisited objects = count of objects in
unvisited parent keys table + count of objects in unvisited child keys table;
   IF total count of unvisited objects = 0
      LEAVE LOOP;
   END-IF
   IF count of objects in unvisited parent keys table > 0 then
      CALL SUBROUTINE 1
   END-IF
   IF count of objects in unvisited child keys table > 0 then
      CALL SUBROUTINE 1
   END-IF
END LOOP
MERGE the visited parent keys table and the visited child keys table into
the results table.
DROP the unvisited parent keys table
DROP the unvisited child keys table
DROP the visited parent keys table
DROP the visited child keys table
COMMIT to the database
```

Subroutine 1:

Subroutine 1 is illustrated as a method 700. The method 700 may be provided for example, as a computer program product implemented as a computer readable storage medium comprising computer readable program code for aggregating keys of objects. The method may also be implemented by a system comprising a microprocessor coupled to a memory, where the microprocessor is programmed by modules stored in the memory, which when executed by the processor, aggregate keys of objects.

The method 700, when called, inserts the objects from the unvisited parent keys table into the visited parent keys table at 702 if evaluating objects in the parent keys table (the first call to SUBROUTINE 1 at 616 of FIG. 6 if objects exist in unvisited parent keys table). The objects in the unvisited parent keys table are marked as visited at 704.

Alternatively, the method 700, when called, inserts the objects from the unvisited child keys table into the visited child keys table at 702 when evaluating objects in the child keys table (the second call to SUBROUTINE 1 at 620 of FIG. 6 if objects exist in unvisited child keys table). The objects in the unvisited child keys table are marked as visited at 704. The marking at 704 may also automatically trigger an update to the count of unvisited objects in the method of FIG. 6.

A compound query statement CSTMT is set to empty at 706. A decision is made at 708 as to whether there are unvisited objects for evaluation.

If the method 700 is processing objects from the parent tables, for each unvisited object in the unvisited parent keys table, the method 700 obtains the primary keys of the unvisited object at 710. For instance, using the OFS_PK table, the method finds the object using the OTYPE field then extracts the primary keys from the KNS_OT2 field. The method 700 then prepares a select query (STMT) for related objects in the parent direction at 712 and calls SUBROUTINE 2 at 714 (e.g., by passing the object type, the select query and the compound query such as by using a call that implements: Call SUBROUTINE 2 (OTYPE, STMT, CSTMT)).

Alternatively, if the method 700 is processing objects from the child tables, for each unvisited object in the unvisited child keys table, the method 700 obtains the primary keys of the unvisited object at 710. For instance, using the OFS_PK table, the method finds the object using the OTYPE field then extracts the primary keys from the KNS_OT2 field. The method then prepares a select query (STMT) for related objects in the child direction at 712 and calls SUBROUTINE 2 at 714 (e.g., by passing the object type, the select query and the compound query in a manner analogous to that described above).

The query at 712 is prepared (not performed) to obtain the parent/child objects based on direction for given object using the prerequisite table OFS_RT. For example, keeping with the examples herein, for SYSTABLES, the parent object is SYSTABLESPACE. For SYSTABLES, the child objects are SYSCOLUMNS, SYSINDEXES, SYSRELS, SYSVIEWS etc. Thus, for the parent direction, an example query for the illustrative implementation looks like: SELECT OTYPE2, JOINCONDITION FROM PTI.OFS_RT WHERE OTYPE1='SYSTABLES' AND DIRECTION='P' FOR FETCH ONLY. For the child direction, an example query for the illustrative implementation looks like: SELECT OTYPE2, JOINCONDITION FROM PTI.OFS_RT WHERE OTYPE1='SYSTABLES' AND DIRECTION='C' FOR FETCH ONLY.

The select query at 712 and the call to SUBROUTINE 2 at 714, are used to prepare a query to obtain the parent objects in the parent direction or to obtain the child objects in the child direction (based upon the direction).

A decision is made at 716, as to whether the direction is PARENT. If the direction is PARENT, the method 700 prepares a select query for Minor objects at 718 and calls SUBROUTINE 2 (for the second time) at 720. This prepares a query to obtain the child (Minor) objects in the parent direction.

Otherwise, a decision is made at 722 as to whether the direction is CHILD (i.e., if the direction is not PARENT). If the direction is CHILD, the method 700 prepares a select query for Major objects at 724 and calls SUBROUTINE 2 at 726. This prepares a query to obtain the parent (Major) objects in child direction.

The method 700 also optionally comprises inserting the unvisited keys from unvisited child keys into the unvisited parent keys if the AUX_IMPL field is set to ON (if implemented) at 728. Thus, if the AUX_IMPL flag is ON (in implementations where this feature is implemented), the parent hierarchy (i.e. parents, grandparents etc.) of a child object is explored.

In a manner analogous to that described for the process in the PARENT direction, if the CHILD direction is being processed, two calls are made to SUBROUTINE 2. Thus, for a given direction, e.g., the PARENT direction or the CHILD direction, parent related objects and child related objects are evaluated.

The method 700 still further comprises adding the new unvisited keys to unvisited parent keys table using CSTMT at 730 and deleting the visited objects from the unvisited parent keys table at 732 (if processing objects from the parent keys table) or the method 700 comprises adding the new unvisited keys to the unvisited child keys table using CSTMT at 730 and deleting the visited objects from the unvisited child keys table at 732 (if processing objects from the child keys object).

Example Pseudocode for SUBROUTINE 1

```
IF Input is from Parent
  INSERT the objects from the unvisited parent keys table into the visited
    parent keys table
  MARK the objects as visited in the unvisited parent keys table
ELSE (must be from Child)
  INSERT the objects from the unvisited child keys table to the visited
    child keys table
  MARK the objects as visited in the unvisited child keys table
ENDIF
SET CSTMT as empty
FOR each unvisited OTYPE in the unvisited parent keys table or for each
unvisited OTYPE in the unvisited child keys table
  OBTAIN the primary keys (e.g., from OFS_PK table)
  PREPARE select query (STMT) for related objects in given direction
  CALL SUBROUTINE 2(OTYPE, STMT, CSTMT)
  IF direction is PARENT
    PREPARE select query for Minor objects
    CALL SUBROUTINE 2(OTYPE, STMT, CSTMT)
  ELSE (must be Child direction)
    PREPARE select query for Major objects
    CALL SUBROUTINE 2(OTYPE, STMT, CSTMT)
    INSERT unvisited objects from the unvisited child keys table into
      unvisited parent keys table if AUX_IMPL is ON
  ENDIF
IF input is from Parent
  ADD the new unvisited keys to the unvisited parent keys table using
    CSTMT
  DELETE the visited objects from the unvisited parent keys table
ELSE (input must be Child)
  ADD the new unvisited keys to the unvisited child keys table using
    CSTMT
  DELETE the visited objects from the unvisited child keys table
ENDIF
```

Subroutine 2:

Subroutine 2 is illustrated as a method 800. In SUBROUTINE 2, the prepared query is executed and the related objects are retrieved. For each related object, SUBROUTINE 2 prepares the select query that obtains the values of primary keys of the related object and appends this prepared query to a compound query using UNION clause.

The method 800 may be provided for example, as a computer program product implemented as a computer readable storage medium comprising computer readable program code for obtaining aggregating keys of objects. The method may also be implemented by a system comprising a microprocessor coupled to a memory, where the microprocessor is programmed by modules or otherwise by code stored in the memory, which when executed by the processor, obtains aggregates keys of objects.

The method 800, when called, receives parameters OTYPE, STMT and CSTMT. The method comprises preparing the schema for the passed object (the object passed as the parameter OTYPE) at 802. The method 800 comprises using the STMT parameter to obtain the related objects and join conditions at 804. The schema is utilized to prepare the fully qualified table name. As an example, given a schema, such as SYSXYZ and OTYPE SYSTABLES, a fully qualified table name looks like SYSXYZ.SYSTABLES. This may be necessary to obtain the primary keys where the fully qualified table name is utilized in a select query.

For example, a statement may look like: SELECT KEY1, KEY2, KEY3, NULL, NULL, NULL, NULL, NULL, NULL FROM SYSXYZ.SYSTABLES OT1, SYSXYZ.SYSCOLUMNS OT2, OFS_TEMP OT3 WHERE (OT1.NAME= OT2.TBNAME AND OT1.CREATOR=OT2.TBCREATOR) AND (OT1.NAME=OT3.KEY1 AND OT1.CREATOR= OT3.KEY2 AND OT3.OTYPE='SYSTABLES')

A decision is made at 806 as to whether there are any related objects to be evaluated. For each related object, the method comprises obtaining the primary keys of the related object at 808 (e.g., using the OFS_PK table). The method 800 further comprises preparing the schema for the related object at 810 and preparing the select query that obtains the values of the primary keys of the related object at 812. The method 800 further comprises appending the prepared select query to the compound query (CSTMT) at 814.

As an example, a select query for the illustrative implementation looks like: SELECT KEY1, KEY2, KEY3, NULL, NULL, NULL, NULL, NULL, NULL FROM SYSXYZ. SYSTABLES OT1, SYSXYZ.SYSCOLUMNS OT2, OFS_TEMP OT3 WHERE (OT1.NAME=OT2.TBNAME AND OT1.CREATOR=OT2.TBCREATOR) AND (OT1.NAME=OT3.KEY1 AND OT1.CREATOR= OT3.KEY2 AND OT3.OTYPE='SYSTABLES').

Example Pseudocode for SUBROUTINE 2

```
PREPARE the schema for given object (OTYPE)
OBTAIN related object and join condition (using STMT)
FOR each related object:
  OBTAIN the primary keys (e.g., from OFS_PK table)
  PREPARE the schema for the related object
  PREPARE a select query that obtains the values of the primary keys of the
    related object
  APPEND the prepared select query to the compound query (CSTMT)
```

Miscellaneous Considerations:

As the NSP approach runs within the relational database process/address space, the good performance is achieved in terms of elapsed time, CPU time and virtual storage. Moreover, the number of SQLs can be optimized further by doing SQL joins subsequently.

Figure 9:
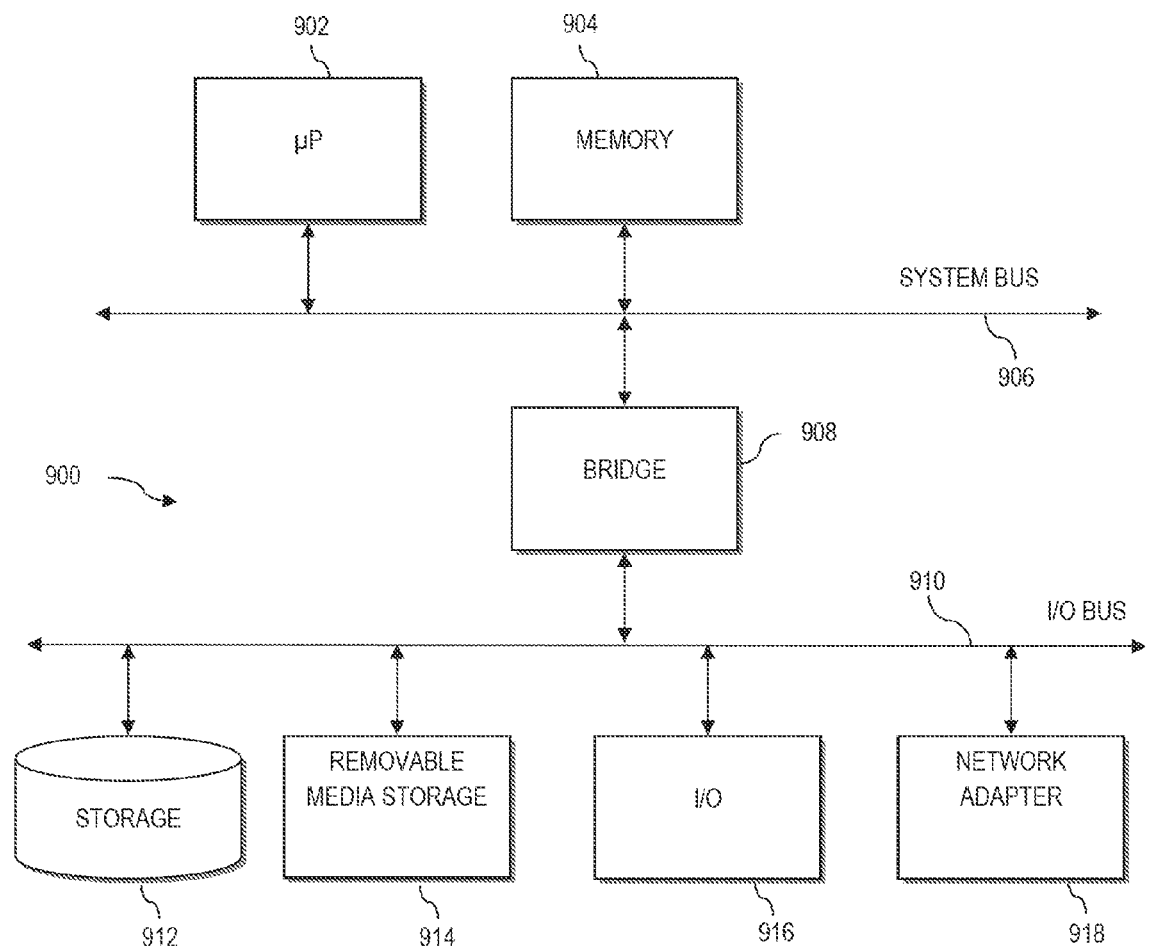
FIG. 9 is a schematic of a computer system comprising computer readable program code for executing any aspects described herein with regard to FIG. 1-FIG. 8, according to various aspects of the present disclosure.

Referring to FIG. 9, a schematic of an exemplary computer system having computer readable program code for executing any aspects described herein with regard to FIG. 1-FIG. 8 is illustrated. The computer system 900 includes one or more microprocessors 902 that are connected to memory 904 via a system bus 906. A bridge 908 connects the system bus 906 to an I/O Bus 910 that links peripheral devices to the microprocessor(s) 902. Peripherals may include storage 912, such as a hard drive, removable media storage 914, e.g., floppy, flash, CD and/or DVD drive, I/O device(s) 916 such as a keyboard, mouse, etc. and a network adapter 918. The memory 904, storage 912, removable media insertable into the removable media storage 914 or combinations thereof, can be used to implement the methods, configurations, interfaces and other aspects set out and described herein with regard to FIG. 1-FIG. 8.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of obtaining and aggregating keys of objects, comprising:
    obtaining a primary object input comprising a primary object of a hierarchical database;
    designating the primary object as unvisited in a parent keys storage;
    designating the primary object as unvisited in a child keys storage;
    performing, using a processor, an object evaluation process until all unique entries in the parent keys storage and all unique entries in the child keys storage have been visited, wherein the object evaluation process selects related objects of the primary object by:
        visiting each unvisited object in the parent keys storage to select related parent keys objects by:
            selecting, for the unvisited object, related objects comprising parent objects in the parent direction that have not already been visited and child objects in the parent direction that have not already been visited; and
            inserting the selected related objects as entries in the parent keys storage identified as unvisited; and
        visiting each unvisited object in the child keys storage to select related child keys objects by:
            selecting, for the unvisited object, related objects comprising child objects in the child direction that have not already been visited and parent objects in the child direction that have not already been visited; and
            inserting the selected related objects as entries in the child keys storage identified as unvisited; and
    committing the keys of at least one related object as an entry to the hierarchical database.

2. The method of claim 1, wherein:
    obtaining a primary object input comprises:
        receiving a set of parameters passed as inputs, the parameters including a name of a results table, the object type of the primary object input and the at least one primary key;
    further comprising:
        storing the primary object as an entry in the parent keys storage by storing the object type of the primary object input and the at least one primary key; and
        storing the primary object as an entry in the child keys storage by storing the object type of the primary object input and the at least one primary key.

3. The method of claim 1 further comprising:
    creating the parent keys storage as two temporary tables comprising a visited parent keys table and an unvisited parent keys table;
    creating the child keys storage as two temporary tables comprising a visited child keys table and an unvisited child keys table;
    deleting each object from the unvisited parent keys table after the object has been visited; and
    deleting each object from the unvisited child keys table after the object has been visited.

4. The method of claim 3 further comprising:
    storing the primary object as an entry in the parent keys storage by inserting the primary object in the unvisited parent keys table; and
    storing the primary object as an entry in the child keys storage by inserting the primary object in the unvisited child keys table;
    wherein:
    visiting each unvisited object in the parent keys storage further comprises:
        identifying a next unvisited object in the unvisited parent keys table and inserting the identified next unvisited object in the visited parent keys table;
    inserting the selected related objects as entries in the parent keys storage identified as unvisited, comprises:
        inserting the selected related parent keys objects in the unvisited parent keys table;
    visiting each unvisited object in the child keys storage further comprises:
        identifying a next unvisited object in the unvisited child keys table and inserting the identified next unvisited object in the visited child keys table; and
    inserting the selected related objects as entries in the child keys storage identified as unvisited, comprises:
        inserting the selected related child keys objects in the unvisited child keys table.

5. The method of claim 1, wherein:
visiting each unvisited object in the parent keys storage to select related parent keys objects, further comprises:
  initially setting a compound query to empty;
selecting, for the unvisited object, related objects comprising parent objects in the parent direction that have not already been visited and child objects in the parent direction that have not already been visited, comprises:
  preparing a select query to obtain the values of the primary keys of the related objects and appending the select query to the compound query;
inserting the selected related objects as entries in the parent keys storage identified as unvisited, comprises:
  adding the selected related objects using the compound query;
visiting each unvisited object in the child keys storage to select related child keys objects, further comprises:
  initially setting a compound query to empty;
selecting, for the unvisited object, related objects comprising child objects in the child direction that have not already been visited and parent objects in the child direction that have not already been visited, comprises:
  preparing a select query to obtain the values of the primary keys of the related objects and appending the select query to the compound query; and
inserting the selected related child keys objects as entries in the child keys storage marked as unvisited, comprises:
  adding the selected related objects using the compound query.

6. The method of claim 1, wherein:
selecting, for the unvisited object, related objects comprising parent objects in the parent direction that have not already been visited and child objects in the parent direction that have not already been visited, comprises:
obtaining the primary keys of the unvisited object;
preparing a select query for related objects in the parent direction; and
performing for each related object,
  obtaining the primary keys of the related object;
  preparing a select query that obtains the values of the primary keys of the related object; and
  appending the select query to a compound query.

7. The method of claim 6 further comprising:
preparing a select query for Minor objects; and
performing for each Minor object:
  obtaining the primary keys of the Minor object;
  preparing a select query that obtains the values of the primary keys of the Minor object; and
  appending the select query to a compound query;
wherein:
inserting the selected related objects as entries in the parent keys storage identified as unvisited comprises:
  adding unvisited keys using the compound query statement.

8. The method of claim 1, wherein:
selecting, for the unvisited object, related objects comprising child objects in the child direction that have not already been visited and parent objects in the child direction that have not already been visited, comprises:
  obtaining the primary keys of the unvisited object;
  preparing a select query for related objects in a child direction; and
  performing for each related object:
    obtaining the primary keys of the related object;
    preparing a select query that obtains the values of the primary keys of the related object; and
    appending the select query to a compound query.

9. The method of claim 8 further comprising:
preparing a select query for Major objects; and
performing for each Major object:
  obtaining the primary keys of the Major object;
  preparing a select query that obtains the values of the primary keys of the Major object; and
  appending the select query to a compound query statement;
wherein:
  inserting the selected related objects as entries in the child keys storage identified as unvisited comprises adding unvisited keys using the compound query statement.

10. The method of claim 1 further comprising:
creating a first table that contains primary keys of each catalog table of a catalog associated with the hierarchical database;
creating a second table that contains the relationships of at least one catalog table with other catalog tables; and
using the first and second tables to perform the object evaluation.

11. The method of claim 1 further comprising:
creating a results table;
creating the parent keys storage as a visited parent keys table and an unvisited parent keys table;
creating the child keys storage as a visited child keys table and an unvisited child keys table;
inserting the primary object into the unvisited parent keys table and the unvisited child keys table;
wherein:
performing an object evaluation process comprises:
  performing the object evaluation process until all unique entries in the parent keys storage and all unique entries in the child keys storage have been visited, by:
    determining a total number of unvisited objects between the unvisited parent keys table and the unvisited child keys table; and
    performing, where the total number determined is greater than zero:
      inserting objects from the unvisited parent keys table into the visited parent keys table and marking the objects in the unvisited parent keys table as visited; and
      inserting objects from the unvisited child keys table into the visited child keys table and marking the objects in the unvisited child keys table as visited;
  merging the visited parent keys table and the visited child keys table into the results table;
  dropping the unvisited parent keys table;
  dropping the visited parent keys table;
  dropping the unvisited child keys table; and
  dropping the visited child keys table.

12. The method of claim 11, wherein:
inserting objects from the unvisited parent keys table into the visited parent keys table, comprises:
  inserting objects from the unvisited parent keys table into the visited parent keys table and marking the objects as visited in the unvisited parent keys table, otherwise setting a compound query statement as empty;
  performing for each unvisited catalog table name in the unvisited parent keys table or for each unvisited catalog table name in the unvisited child keys table:
    obtaining the primary keys;
    preparing a select query for related objects in predetermined direction; and executing the prepared query to retrieve related objects.

13. The method of claim 12 further comprising:
performing where the direction is in a parent direction:
   preparing a select query for Minor objects; and
   executing the prepared query to retrieve related objects.

14. The method of claim 12 further comprising:
performing where the direction is in a child direction:
   preparing a select query for Major objects; and
   executing the prepared query to retrieve related objects.

15. The method of claim 11, wherein:
inserting objects from the unvisited child keys table into the visited child keys table, comprises:
   inserting the objects from the unvisited child keys table to the visited child keys table and marking the objects as visited in the unvisited child keys table setting a compound query statement as empty; and
performing for each unvisited catalog table name in the unvisited parent keys table or for each unvisited catalog table name in the unvisited child keys table:
   obtaining the primary keys;
   preparing a select query for related objects in given direction;
   executing the prepared query to retrieve related objects;
   performing where the direction is in a parent direction:
      preparing a select query for Minor objects; and
      executing the prepared query to retrieve related objects; and
   performing where the direction is in the child direction:
      preparing a select query for Major objects; and
      executing the prepared query to retrieve related objects.

16. The method of claim 15 further comprising:
inserting unvisited objects from the unvisited child keys table into unvisited parent keys table.

17. The method of claim 11 further comprising:
performing where input is from a parent:
   adding new unvisited keys to the unvisited parent keys table; and
   deleting the visited objects from the unvisited parent keys table.

18. The method of claim 11 further comprising:
performing where input is from a child:
   adding the new unvisited keys to the unvisited child keys table; and
   deleting the visited objects from the unvisited child keys table.

19. The method of claim 11, wherein:
executing the prepared query to retrieve related objects, comprises:
   executing the prepared query to retrieve the related objects by preparing a select query that obtains the values of primary keys of the related object and appending the prepared query to a compound query using a UNION clause.

20. The method of claim 11, wherein:
executing the prepared query to retrieve related objects, comprises:
   preparing the schema for given object;
   obtaining related object and join condition; and
   performing for each related object:
      obtaining the primary keys;
      preparing a schema for the related object;
      preparing a select query that obtains the values of the primary keys of the related object; and
      appending the prepared select query to the compound query.

* * * * *